Patented May 6, 1952

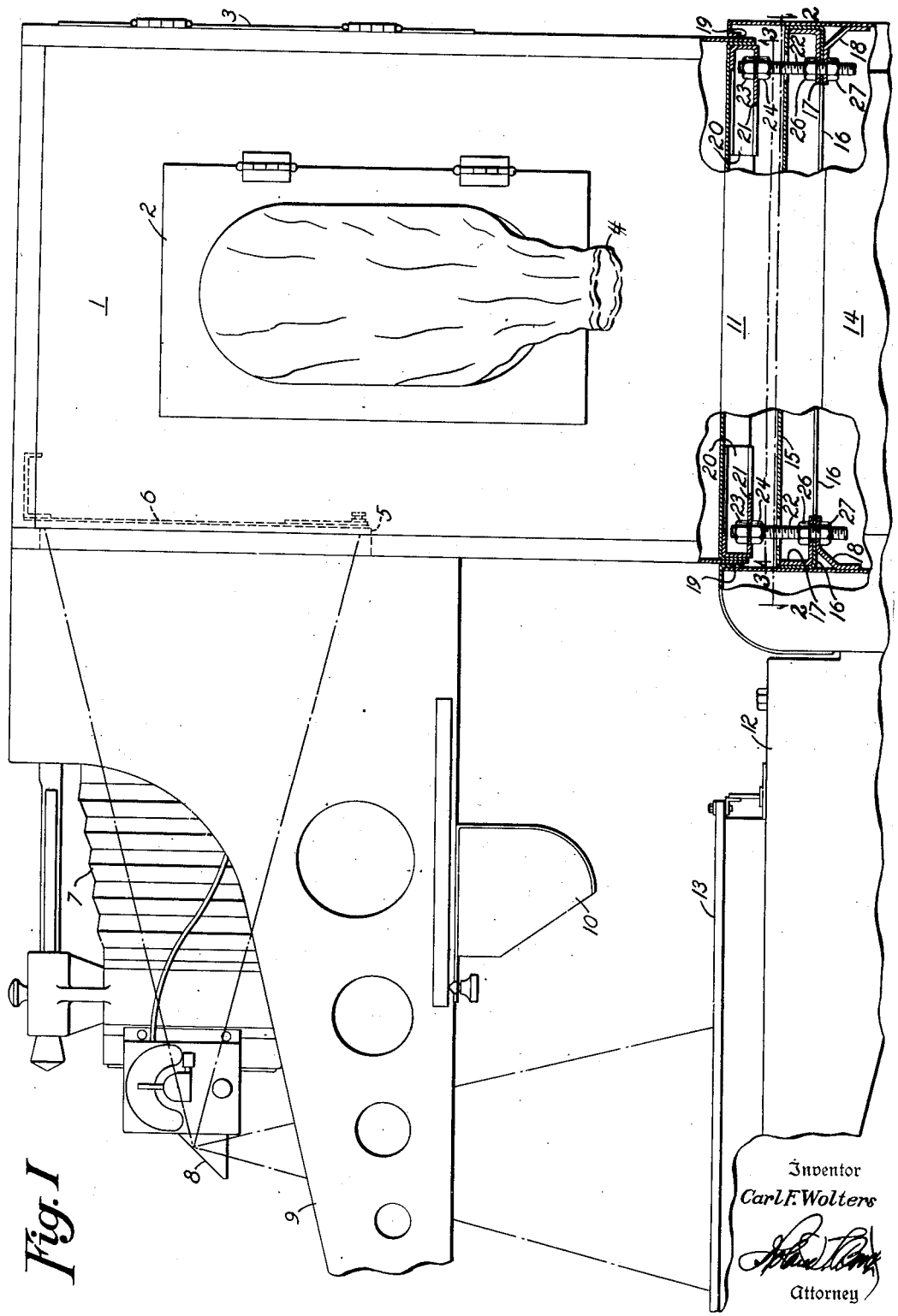

2,595,741

UNITED STATES PATENT OFFICE 2,595,741

DOCUMENT PHOTOGRAPHING CAMERA

Carl F. Wolters, New Canaan, Conn., assignor to Remington Rand Inc., New York, N. Y., a corporation of Delaware Application January 31, 1950, Serial No. 141,449

2 Claims. (Cl. 88—24)

Patents 2,042,005, granted May 26, 1936; 2,323,600, granted July 6, 1943, and 2,346,217, granted April 11, 1944, describe document photographing apparatus of a class in which a camera unit comprising a shutter lens mounting and reflecting prism on the end of an adjustable bellows or equivalent structure extend out from the front wall of a dark box to overhang a horizontally disposed copy table mounted upon a base member which also provides a support for the dark box. In operation a document to be photographically copied is placed face upwards on the copy holder so that its image is reflected by the prism and focussed through the lens onto photo-sensitive sheet material located in a holding frame in the dark box behind the bellows.

The present invention relates to apparatus of that class and provides means whereby the object-to-lens distance and correct orientation of the holding frame in relation to the surface of the copy table can be accurately achieved in a very simple matter at installation of the apparatus.

In the drawings:

Fig. 1 is a side elevation showing the upper part of one form of document photographing camera partly broken away to illustrate the essential features of the present invention.

Figure 3:
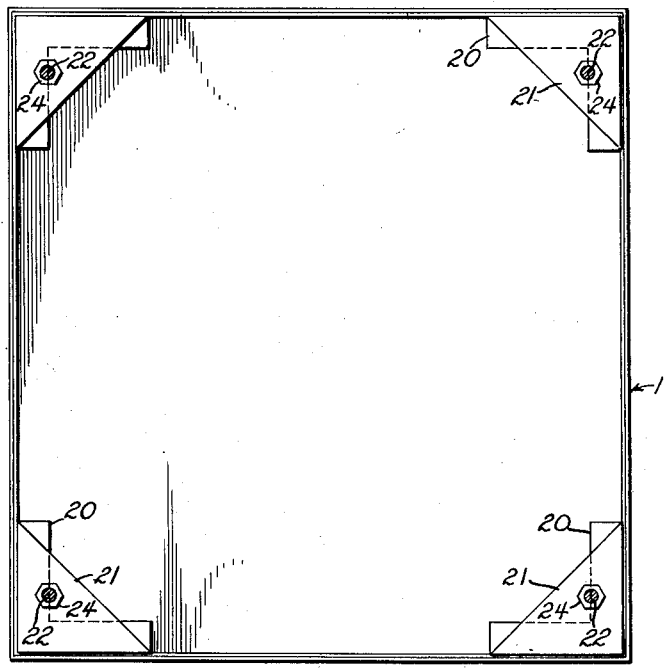
Fig. 3 is a section on the line 3—3 of Fig. 1.

The dark box 1 provides the main supporting element of the camera unit, being formed as a rectangular compartment closed at the top and bottom and having an access door 2 in one side wall and an access door 3 in the back wall. The access door 2 has a central opening which is closed by a flexible sleeve 4 which is so constructed that it provides for access to the interior of the dark box but does not permit entry of sufficient light to fog the photo-sensitive sheet material used for document copying. The front wall of the dark box is provided with an opening which is closed by a glass plate forming the front of a sheet holding frame seen in dotted lines at 5. The operator gains access to the sheet holding frame by inserting his hand into the interior of the dark box through the flexible sleeve 4, and a hinged clamping plate, 6 also shown in dotted lines in Fig. 1, serves to hold a sheet of sensitive material in the frame. The usual extensible bellows structure 7 extends from the front wall, and at its front end has a normal shutter and lens through which an image can be focussed onto the sensitive sheet material in the holding frame 5. Since as will later be understood, the lens overhangs the copy table, a reflecting prism 8 is provided in front of the lens to reflect the image into alignment with the optical axis of the lens.

In addition to the bellows structure there also extends from the dark box a pair of brackets one of which is seen at 9 broken away at its end. The brackets are located on each side of the bellows and serve to suspend lamp housings, the rearmost of which is seen at 10, for illuminating a document on the copy table.

The dark box thus forms the main supporting element of the camera unit, and is itself supported on the base member generally indicated by the reference numeral 11. A vertically adjustable support structure 12 is provided on the front of the base member 11 which carries the horizontally disposed copy table 13.

The structure so far described and the manner of its operation is old in the art and is fully described in the aforesaid prior patents; further description of the general nature of the apparatus and its manner of operation is therefore considered superfluous here. It is, however, important that, on installation, the camera unit be accurately set up on the base so that the initial object to lens distance is correct and that the image of a document in its proper position on the copy table 13 is properly oriented and centered and wholly included in the sheet holding frame 5. Essentially the present invention is concerned with the provision of a convenient means for securing such initial adjustment and will now be described.

In the form shown the base 11 is a cabinet structure reinforced to take the weight of the camera unit. The cabinet has an access door 14, or a removable panel in one side, so that the cabinet may serve as storage space. The closure for the top of the cabinet structure itself is constituted by the horizontal plate 15 which is turned down at its edges and then turned inwardly to provide horizontal short flange portions 16, thus providing a shallow box-like member with a rectangular opening at the bottom defined by the inner marginal edges of the flanges 16, and the walls of the flanges are reinforced by angle section strips 17. Brackets 18 are also provided on the under surface of the flanges 16 for engagement with the front and back interior walls of the cabinet, the reinforced open bottom-like structure with the brackets 18 thus constituting a unit of substantial strength which may be secured in the cabinet for example by welding and which, when installed, provides a supporting frame capable of transmitting the weight of the camera unit to the cabinet structure. The plate 15 serves as a closure for the top of the cabinet, with the plate 15 defining the base of a recess the open top of which is defined by the short vertical flange portions 19. The flange portions 19 thus cooperate to define a short rectangular locating frame in which the bottom part of the dark box can be engaged.

Figure 2:
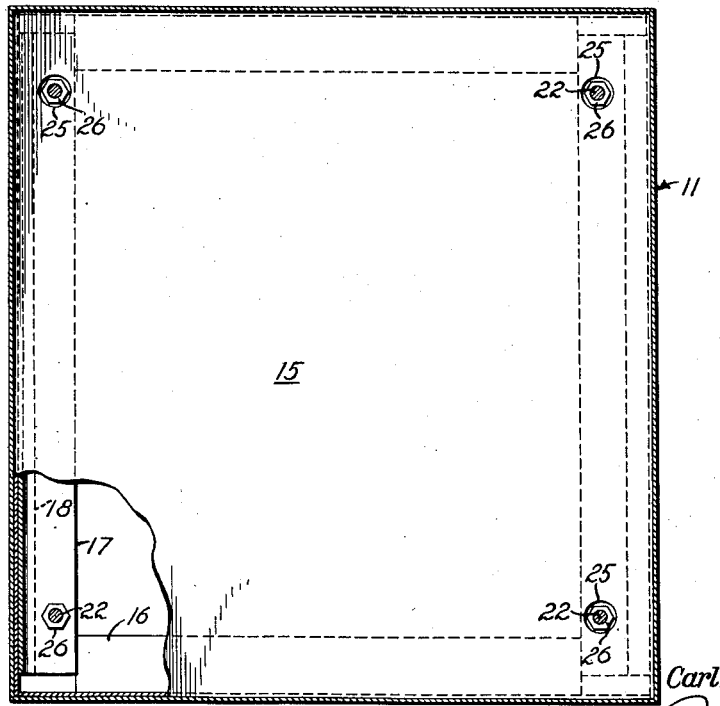
Fig. 2 is a section on the line 2—2 of Fig. 1 partly broken away.

The bottom of the dark box is also recessed and at each corner is reinforced by an angle bracket reinforcement 20 including a triangular reinforcing web 21 at the bottom. The webs 21 best seen in Fig. 3 are each drilled for the reception of adjustable fixing stud 22. The studs 22 are anchored to the respective webs 21 by nuts 23 and 24 respectively above and below the webs 21, and thus project downwardly from the bottom at each corner of the dark box. Clearance holes are drilled coaxially through the plate 15, the horizontal portion of the angle section strips 17, flange portions 16 and the horizontal portions of the brackets 18 for the reception of the lower ends of the studs 22. In Fig. 2 the clearance holes in the plate 15 are indicated by the reference numeral 25.

At installation the upper adjustment nuts 26 are threaded onto the studs 22 and the bottom part of the dark box is entered through the frame defined by the flanges 19. It will be noted that the holes 25 in the plate 15 are of such diameter that they allow the nuts 26 to pass through but the aligned stud holes in the flanges 16 reinforcement 17 and bracket 18 permit entry of the studs with clearance which is so small that the nuts 26 rest upon the reinforcement 17 and thereby support the dark box 1 along with the remainder of the camera structure carried thereby. The nuts 26 are accessible through the opening defined by the flange portions 16 when the access door is open and the nuts 26 can be individually adjusted to achieve accurate initial adjustment of the object to lens distance and for squaring up the sheet holding frame 5 with the surface of the copy holder 13. Having achieved the necessary adjustment, the installation is finally made secure by tightening up the lock nuts 27 which are accessible with the access door 14 open.

It will be appreciated that since the apparatus according to the present invention is used for document copying, the written matter of which has to be readable on the photographic copy, the focussing has to be extremely accurate. It has been found in practice that any attempt to set up the apparatus accurately by standard measurement with the use of gauges for final assembly on a production basis does not in general achieve the required degree of definition in the finished photographic copy because, between the individual lenses of the series of supposedly identical commercial lenses, there are differences in their exact focal length. Often the difference is slight but it is in many cases enough to impair the definition if complete reliance is placed upon the manufacturers stated focal length. Slight inaccuracy in the object to lens distance may also result in the projected image on the photo-sensitive sheet material in the holding frame being too large or too small for the size of sheet used for copying.

To overcome those possible defects, it is the practice when assembling the apparatus according to the present invention to set the camera unit up so that it is squarely supported on the base with the object to lens distance accurately dimensioned on the basis of the manufacturers' stated focal measurement. At the final inspection stage, trial photographs will reveal any inaccuracy and appropriate adjustment can be made on the adjustment nuts 26.

It is to be understood that the bellows structure may be replaced by a tube structure which may be telescopic to provide different degrees of magnification or in a camera unit intended for producing copies of a predetermined magnification from documents supported on a fixed copy table, the tube may be of standard length as described for example in the aforesaid Patent 2,042,005, and in the ensuing claims such modifications are intended to be included in the general term bellows structure.

The invention claimed is:

1. Document photographing apparatus of the class described comprising a camera unit including a dark box having front, back and side walls and top and bottom walls defining a substantially rectangular box-like structure, an opening in said front wall at the upper part thereof, means in said dark box registering with said opening for holding photo-sensitive sheet material substantially in a plane parallel with the front wall of said dark box, a bellows structure enclosing said opening and extending forwardly from said front wall on a fixed plane perpendicular thereto, means in at least one of said walls giving access to the sheet holding means through the interior of said dark box, a base, a copy supporting means mounted in parallel planar relation with said base for positioning a document to be copied in spaced relation below said bellows structure, optical means including reflector and lens means at the front end of said bellows structure for focusing the image of a document on the copy supporting surface of said copy supporting means onto photo-sensitive material in said sheet holding means, studs projecting downwardly from the bottom of said dark box, one near each corner thereof, screw-thread means on the projecting end of each of said studs, supporting means on said base, apertures in said support means receptive of projecting ends of said studs, and nut means threadably engaged on said studs cooperative with said supporting means for adjustably varying the plane of said dark box bottom wall to accurately center the optical axis of said lens means on said document supporting means in exact focal length relation therewith.

2. Apparatus as set forth in claim 1 having lock nuts provided on the lower extremities of said studs for engagement with an under-part of said supporting frame to secure said optical means in focal registration with said copy supporting means.

CARL F. WOLTERS.

REFERENCES CITED

The following references are of record in the file of this patent:

UNITED STATES PATENTS

| Number | Name | Date |
|---|---|---|
| 1,802,193 | Caps | Apr. 21, 1931 |
| 2,324,842 | Huebner | July 20, 1943 |

FOREIGN PATENTS

| Number | Country | Date |
|---|---|---|
| 174,622 | Great Britain | June 25, 1923 |